March 4, 1924.
J. D. JONES
1,485,985
VACUUM CONTROLLED LUBRICATING BEARING
Filed Aug. 3, 1923
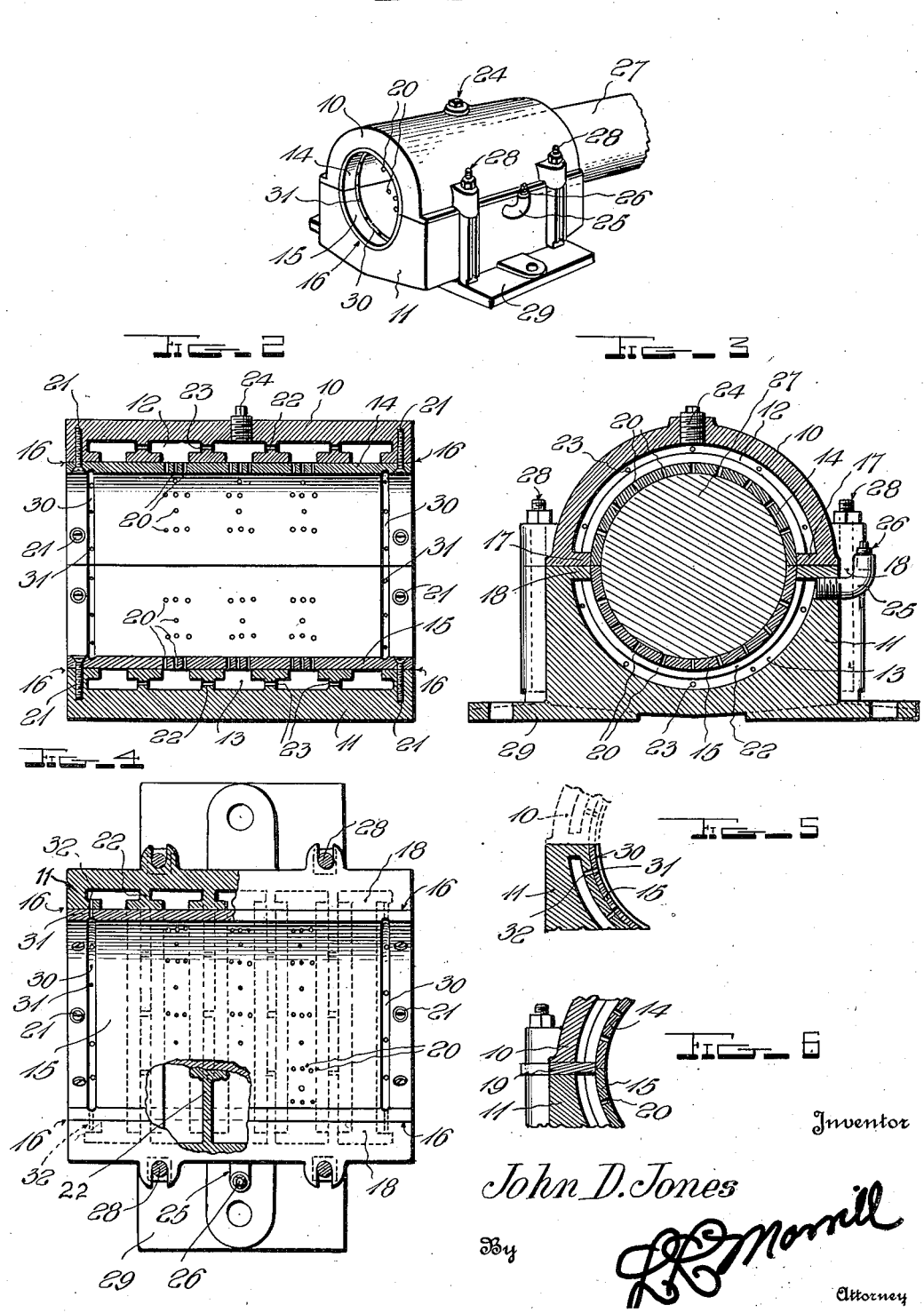

Patented Mar. 4, 1924.

1,485,985

UNITED STATES PATENT OFFICE.

JOHN D. JONES, OF WALLA WALLA, WASHINGTON.

VACUUM-CONTROLLED LUBRICATING BEARING.

Application filed August 3, 1923. Serial No. 655,465.

*To all whom it may concern:*

Be it known that I, JOHN D. JONES, a citizen of the United States, residing at Walla Walla, in the county of Walla Walla and State of Washington, have invented certain new and useful Improvements in Vacuum-Controlled Lubricating Bearings, of which the following is a specification.

This invention relates to vacuum controlled lubricating bearings and has for an object to provide a bearing having in communication therewith an air tight oil containing chamber communicating with the journal of the bearing between which and the atmosphere an oil seal is maintained by the film of oil surrounding the journal.

A further object of the invention is to provide the oil chamber in juxtaposition to the journal so that a plurality of oil feeding perforations may be provided between the oil chamber and the journal for supplying the oil at a plurality of points.

A further object of the invention is to provide a liquid tongue and groove connection between the journal and the bearing member, also controlling the air inlet whereby the vacuum in the chamber is more readily and delicately broken when an additional supply of lubricant is required by the journal.

A further object of the invention is to provide a bearing having upper and lower vacuum lubricating containing chambers, each one operating independently of the other and either one adapted to supply lubricant to the journal by the breaking of the vacuum in its particular chamber.

With these and other objects in view, the invention comprises certain novel parts, elements, units, combinations, arrangements, interactions and functions, as disclosed in the drawings, together with mechanical and functional equivalents thereof as will be hereinafter more fully described and claimed.

In the drawings:

Figure 1 is a perspective view of one embodiment of the present invention employed for illustrative purposes.

Figure 2 is a diametrical sectional view through the bearing taken on a plane which will, under normal conditions, be vertical.

Figure 3 is a transverse sectional view through the journal and bearing, taken on a plane which will normally also be vertical.

Figure 4 is a plan view of the lower half of the journal bearing with the top removed and parts broken away to show bushing supporting ribs.

Figure 5 is a fragmentary detail view showing the communication between the end grooves and the oil chamber.

Figure 6 is a fragmentary detail view of a modification wherein the separation of the two oil chambers is accomplished by an independent shim.

Like characters of reference indicate corresponding parts throughout the several views.

The vacuum controlled lubricating bearing which forms the subject matter of this application may assume a great variety of forms and the showing of the bearing as illustrated in the drawings is only illustrative of the invention and is not intended as any limitation thereon. The bearing as shown is intended as a stationary bearing for journaling a rotating shaft, but it is obvious that the relation of shaft and bearing may be reversed without departing from the invention and the bearing rotated about a stationary shaft.

In any event, the bearing comprises a section 10, for convenience referred to as the upper section, and a lower section 11, likewise for convenience referred to as the lower section, it being understood that the term "upper" and " lower" so employed applies principally to a stationary bearing and that the sections would be similarly arranged on a rotating bearing.

Within the sections 10 and 11, oil chambers 12 and 13 are provided with a bushing, preferably composed of the sections 14 and 15. This bushing, composed of the sections 14 and 15, may be of any usual and ordinary type of bushing as, for instance, composed of Babbitt metal, brass or the like, and the invention is in no way limited to the material. The ends of the bushing form air tight connections at 16 with the sections 10 and 11 and the chambers 12 and 13 are completed in their air tight relation by means of ribs 17 formed on the section 10, and 18 formed on the section 11, as shown at Figures 3 and 4, or by the use of an independent shim 19 interposed between the sections as shown at Figure 6.

In either form, the bushing is provided with a plurality of perforations 20 forming communication between the journaling surface of the bushing and the chambers 12 and 13.

The bushings may be maintained within the sections in any approved manner to produce air tight joints as by the screws or bolts 21, so that said chambers except for the perforations 20 are completely and wholly isolated from the journal opening.

Merely for the purpose of supporting the bushing intermediate its length, a plurality of ribs 22 are formed on the sections, said ribs having an internal perimeter corresponding accurately with the perimeter of the ends of the sections whereby the bushing is uniformly supported.

For producing the effect of single chambers, irrespective of the ribs, said ribs are provided with intercommunicating ducts 23 so that the oil contained within said chambers may flow freely through said ducts and producing the equivalent of a continuous, uninterrupted chamber.

For charging the upper chamber 12, any usual and ordinary type of closure may be employed, shown in the drawings as a screw-threaded plug 24, and means for charging the lower chamber 13 may be by means of a tubular spout 25 with a similar screw-threaded plug 26 therein, or any convenient and ordinary type of closure.

Means for securing together the sections 10 and 11 to inclose the shaft 27 is provided in the bolts 28 and a base 29 may and preferably will likewise be provided for supporting the bearing as an organized structure.

As supplemental to the openings 20, grooves 30 may be formed in the bushing adjacent the ends thereof with perforations 31 communicating with the chambers 12 and 13. As shown at Figure 4, these perforations will register with perforations 32 formed in the end ribs, but it is to be understood, of course, that the location of the perforations 32 in register with the perforations 31 is merely a matter of mechanical detail and the supporting device at the end may be constructed to avoid the necessity of such perforations.

In operation, the chambers 12 and 13 are filled with oil by the removal of the plugs 24 and 26 and the plugs replaced as quickly as convenient. The oil being introduced in a comparatively cold condition will not run out through the bearing unduly during the interval that the plugs are removed for filling purposes. The plugs are then returned to position and screwed into air tight relation whereby the chambers 12 and 13 are air tight. The film of oil formed about the journal will produce a liquid seal intervening between the atmosphere and the perforations 20 whereby the external atmospheric pressure will prevent the discharge of oil about the journal so long as the external atmospheric pressure is maintained. When the wear of the lubricant has been such as to admit air, the admission of air will be to the chambers 12 or 13 through the perforations 20 which will permit the discharge of a small amount of oil from either one of said chambers as exigencies of use require, so that the journal is at all times maintained in properly lubricated position without the wasting of oil. It is obvious that these chambers 12 and 13 may be of considerable capacity so that a considerable volume of oil may be maintained in intimate contact with the journal bearing to be discharged into the bearing when necessary.

For heavy duty bearings, the additional groove 30 upon each end of the bearing is found desirable. The oil entering this groove and surrounding the shaft forms a tongue and groove connection at this point. This tongue and groove additional liquid seal is, of course, also maintained against outflow by atmospheric pressure, but by reason of its location adjacent the ends of the journal and the greater space intervening between the shaft and the bottom of the groove, the vacuum is broken at this point more quickly and delicately than at the openings 20, so that in heavy duty journals the additional tongue and groove liquid seal is found desirable. By the use of this additional liquid seal, a larger amount of lubricant is furnished to the journal and it is not necessary to wait as complete an exhaustion of the lubricating body as in the type where the groove 30 is not employed.

In either type, however, the oil intervening between the shaft and bushing forms a liquid seal whereby external air pressure of the atmosphere is applied to hold back the oil and permit it to enter the journaling interval only as required for lubricating purposes.

It will be obvious that for comparatively small or light duty journals, a single chamber, wholly surrounding the bushing, will serve the purpose. The bearing as illustrated is intended for heavy duty service and for journaling shafts having either an upward or downward stress. The use of the two oiling chambers is to properly lubricate the bearing whether the stress of the journaled shaft be upward or downward. As an illustration of the type of journaling referred to, rolls for various purposes may be cited wherein the upper roll is subjected to excessive upper stress and the lower roll to excessive downward stress. The same bearing may be employed for the upper or lower journal in these cases and the lubrication will be properly taken care of by the independent oiling systems provided by the independent chambers and their associated parts and instrumentalities.

What I claim to be new and desire to secure by Letters Patent is:

1. A vacuum controlled lubricating bearing, comprising a shaft and a sleeve, an oil chamber in communication with the interval between the shaft and sleeve, and means to maintain a liquid seal about said shaft.

2. A vacuum controlled lubricating bearing, comprising a shaft and a sleeve, an oil chamber in communication with the interval between the shaft and sleeve, and means to employ atmospheric pressure to maintain a liquid seal between the chamber and the external air.

3. A vacuum controlled lubricating bearing, comprising a shaft and journaling sleeve, an air tight oil chamber, said sleeve being provided with perforations forming communication with said oil chamber and adapted to supply to the shaft a film of oil forming a liquid seal between the chamber and the external air.

4. A vacuum controlled lubricating bearing, comprising a shaft, a journaling sleeve, an oil chamber surrounding the shaft and having communication therewith by perforations through the sleeve, means to seal the chamber against the introduction of air, and means to employ the exuded oil as a liquid seal between the chamber and the external air.

5. A vacuum controlled lubricating bearing, comprising a shaft, a chamber surrounding the shaft and spaced therefrom by a bushing provided with perforations, and means to maintain lubricant within said chamber by aerostatic pressure.

6. A vacuum controlled lubricating journal, comprising a shaft, a journaling sleeve surrounding the shaft, an oil chamber surrounding the sleeve and communicating with the interval between the sleeve and shaft by perforations through said sleeve, means to maintain said chamber against the introduction of air, means to employ the film of lubricant in the interval between the sleeve and shaft as a liquid seal, and means providing an additional liquid seal adjacent the opposite ends of said sleeve.

7. A vacuum controlled lubricating bearing, comprising a shaft, a sleeve journaling the shaft, an oil chamber surrounding the shaft and spaced therefrom by the sleeve, said sleeve being provided with perforations forming communication between the chamber and the interval between the shaft and sleeve, said sleeve also being provided adjacent its opposite ends with grooves also communicating with the oil chamber, and means to employ atmospheric pressure externally of the chamber for restraining the exudance of the lubricant contained in said interval and said groove, forming a liquid seal between the external air and the chamber.

8. A vacuum controlled lubricating bearing, comprising a shaft, a sectional sleeve which combined forms a journal for the shaft, independent oil chambers, each employing a section of said sleeve as one of its walls, said sleeve sections being provided with perforations forming communication between the journaling interval and the chamber, and independent air tight closures for charging said chambers with lubricant.

9. A vacuum controlled lubricating bearing, comprising a shaft, a journaling sleeve composed of separable sections embracing said shaft, a housing formed in separable sections carrying said sleeve sections and providing chambers in said sections wholly surrounding said sleeve with perforations through said sleeve sections forming communication between said chambers and the journaling interval, and means at the plane of connection of said housing sections dividing said chambers into independent compartments.

In testimony whereof I affix my signature.

JOHN D. JONES.